United States Patent
Brimhall (12)

(10) Patent No.: US 6,207,044 B1
(45) Date of Patent: Mar. 27, 2001

(54) SOLVENT EXTRACTION OF HYDROCARBONS FROM INORGANIC MATERIALS AND SOLVENT RECOVERY FROM EXTRACTED HYDROCARBONS

(76) Inventor: Gary C. Brimhall, 4342 S. 1145W. #45C, Salt Lake City, UT (US) 84123

( * ) Notice: Subject to any disclaimer, the term of this patent is extended or adjusted under 35 U.S.C. 154(b) by 0 days.

(21) Appl. No.: 09/385,385

(22) Filed: Aug. 30, 1999

Related U.S. Application Data (63) Continuation-in-part of application No. 08/676,950, filed on Jul. 8, 1996, now abandoned.

(51) Int. Cl.$^7$ ..................................................... C10G 1/04
(52) U.S. Cl. .............................. 208/390; 208/44; 208/14; 208/309
(58) Field of Search ..................................... 208/390, 309, 208/44

(56) References Cited

U.S. PATENT DOCUMENTS

| | | |
|---|---|---|
| 4,046,669 | 9/1977 | Blaine et al. . |
| 4,057,485 | 11/1977 | Blaine et al. . |
| 4,342,639 | 8/1982 | Gagon . |
| 4,494,605 * | 1/1985 | Wiechel ............................... 166/288 |
| 4,532,024 | 7/1985 | Haschke et al. . |
| 4,704,200 * | 11/1987 | Keane .................................... 208/390 |
| 5,066,386 * | 11/1991 | Paspek et al. . |
| 5,789,649 * | 8/1998 | Batchelor et al. .................... 588/206 |
| 5,895,506 * | 4/1999 | Cook et al. ........................... 585/734 |

* cited by examiner

*Primary Examiner*—Helane E. Myers
(74) *Attorney, Agent, or Firm*—Thorpe North & Western LLP (57) ABSTRACT

A process for the solvent separation of hydrocarbons from tar sand or contaminated soils comprises extracting the hydrocarbons from the sand or soil in a solvent extraction means to form a hydrocarbon rich solvent solution. The rich solvent is separated from the hydrocarbon in a process that utilizes flashing of the solvent in a heated flashing column at ambient pressure. The hydrocarbon is withdrawn from the bottom of the column and the flashed solvent vapors are strategicly withdrawn and passed into a condensation column from which the condensed solvent may be recycled. The flashing column is divided by a series of horizontal, vertically aligned apertured trays. The solution is introduced into the top of the column and the flashing operation is facilitated by the increase in the surface area of the solution as it flows by gravity from tray to tray. The column is maintained at a temperature, preferably above the boiling temperature of the solvent. The process is particularly adapted to the use of chlorinated hydrocarbon solvents and most particularly to the use of methylene chloride.

22 Claims, 5 Drawing Sheets

SOLVENT EXTRACTION OF HYDROCARBONS FROM INORGANIC MATERIALS AND SOLVENT RECOVERY FROM EXTRACTED HYDROCARBONS

This application is a continuation-in-part of 08/676,950 filed Jul. 8, 1996 now abondoned.

BACKGROUND OF THE INVENTION

1. Field

This invention relates to the solvent extraction of hydrocarbon materials from inorganic matter such as from oil spills, tar sands, sludge ponds and the like and the recovery of solvent from the separated hydrocarbons. More particularly, this invention relates to an apparatus and process for the processing of tar sands and the remediation of oil spill sites and sludge ponds or other hydrocarbon contaminated locations using a low boiling chlorinated solvent and the subsequent recovery of solvent from the separated hydrocarbons. This invention also relates to the separation of a liquid having a lower vapor pressure from a liquid having a higher vapor pressure and to a flashing apparatus for accomplish said separation.

2. State of the Art

It is well known that there are large deposits of bituminous hydrocarbons throughout the world, particularly in Canada and the United States. These are commonly referred to as tar or oil sands. The exact bitumen composition and sand particle envelopment, e.g. with either water or oil surrounding the sand particles, may vary from site to site but all are susceptible to solvent extraction of the bitumen from the inorganic particles and the need to dispose of the lean sands in an environmentally acceptable manner.

There are numerous processes which have been developed and patented relating to the processing of such deposits using various extraction means including hot and cold water extraction; solvent extraction; combinations of water and solvent extraction; oleophilic sieve separations and the like.

In addition, there is a constantly escalating environmental contamination problem associated with the deliberate or accidental deposition of hydrocarbons of various types on both land and sea. For example, petroleum dumps, drilling rig sludge ponds, oil refineries, retail gas stations, chemical plants, superfund sites, pipeline and tanker spills on both land and sea all contribute to the environmental pollution of the sites where hydrocarbons are deposited and may lead to pollution of other locations due to spillage into waterways or migration to surrounding soils unless removed and/or contained.

Thus far, most soil remediation processes have involved either hauling the hydrocarbon contaminated soil to a more remote storage site or dump or the building of a containment barrier around and/or over the contaminated site. Little had been done to actually remediate or restore contaminated soils to a clean or original condition. Some remediation suggestions have involved burning off the hydrocarbons, bioremediation and water or solvent extraction. Burning only exacerbates problems of pollution and water or water/solvent extraction processes contaminates the water. Further, many sites needing remediation are not near water sources. Solvent recovery processes often require the addition of one or more solvents which cannot then be completely or economically separated from the hydrocarbon they are to extract resulting in loss of both solvent and extracted hydrocarbon.

Because of similarities between hydrocarbons deposited on or soaked into soils and the naturally occurring tar sand deposits, processes suitable for the extraction of bitumen from tar sands seem likely methods for also cleaning up soil sites contaminated by spilled or residual hydrocarbons. Since many sites needing remediation are not conveniently located near water supplies, solvent removal processes are preferred if practical.

Blaine, U.S. Pat. Nos. 4,046,669 and 4,057,485, disclose a process for extracting oil from tar sands utilizing a chlorinated solvent such as monochloroethane, dichloroethane, trichloroethane or tetrachloroethane.

Gagon, U.S. Pat. No. 4,342,639, is drawn to a process of removing bitumen from tar sands using a chlorinated solvent, preferably methylene chloride, that is heavier than water. The solvent extraction of bitumen from the sand takes place under a blanket of water, preferably at ambient pressure and at a temperature which is below the boiling point of the solvent at the pressure used. The bitumen rich solvent solution is withdrawn from the lower portion of the extraction chamber and the cleaned sand is washed by passing through the water blanket layer and disposed of. The bitumen rich solvent solution is subjected to flash evaporation to separate the bitumen from the chlorinated solvent in an evaporation chamber maintained under a negative pressure. The solvent vapors removed overhead are placed under positive pressure by a compressor and introduced into a condenser.

Haschke et al., U.S. Pat. No. 4,532,024, summarizes a compendium of solvent extraction systems for treating tar sands. Predominant among these methods is the use of chlorinated hydrocarbon solvents. Most of these are deficient in that they do not provide for the complete removal of the solvent from the extracted bitumen prior to further refining. The means mentioned for separation of solvent from the bitumen include flash distillation and conventional evaporation and ambient temperature evaporation. It is concluded by Haschke et al. that, of the chlorinated solvents, methylene chloride has the best overall properties for extraction of bitumen because it behaves as a nonflammable solvent, has the greatest solvency power of solvents tested, has a workplace safety standard which can be achieved with good work practices and is one of a few solvents that the EPA has determined to have insignificant photochemical reactivity and consequently its emissions may not have to be controlled under regulatory VOC emission regulations. A primary thrust of this patent is the removal of methylene chloride from the bitumen in a two step process. The first step involves the simple distillation of the major portion of the solvent followed by a second step which uses a high-boiling stripper diluent solvent to remove the residual solvent. It is stated that, with the proper stripper diluent solvent, essentially complete removal of residual halogenated solvent is accomplished by monitoring the temperature of the exiting bitumen product stream. In other words, it is desirable to choose a stripper diluent solvent that has an acceptable boiling point to strip out all residual chlorinated hydrocarbon solvent. Not all of the stripper solvent is removed from the bitumen and some may be deliberately left in or even added to control the viscosity of the bitumen for purposes of transportation and refining. Suitable stripper diluents are stated to be intermediate boiling hydrocarbon fractions such as mineral sprits, Stoddard solvent, xylene, kerosene and #2 diesel oil. Also, pure components, such as ethyl benzene which has a suitable boiling point, can be used. This process has the disadvantage that a stripper diluent must be transported to the remediation site or tar sand extraction site and also is not completely recovered but incorporated into the recovered contaminant hydrocarbon or extracted tar sand. It is both expensive and inefficient to require the addition of an extra component in order to recover and remove the extracting chlorinated hydrocarbon solvent Moreover, to remove the chlorinated solvent it is necessary to heat the solution containing the stripper solvent to temperatures above the boiling point of the stripper solvent. This required the heating of relatively large amounts of solution, including the bitumen recovered from the tar sand extraction, to temperatures well above the boiling point of water, e.g. from about 130° to 160° C. (265°–320 ° F.).

It would therefore be highly beneficial to develop a process for the efficient removal of hydrocarbons from soils in a remediation process or in the extraction of bitumen from tar sands wherein essentially complete removal of the solvent from the hydrocarbon or bitumen could be obtained without the need of extra processing steps and wherein the solvent could be recovered almost quantitatively in a closed system without environmental damage to the surrounding atmosphere.

OBJECTS AND BRIEF SUMMARY OF THE INVENTION

It is an object of the present invention to provide a process for the extraction of bitumen or residual hydrocarbons from inorganic materials by means of a chlorinated hydrocarbon solvent wherein the hydrocarbon separation from inorganic materials is essentially complete.

Another object of the invention is to provide a process for the extraction of bitumen or residual hydrocarbons from inorganic materials wherein the solvent content on the inorganic materials following extraction is minuscule. An additional object of the invention is to provide a process for the extraction of bitumen or residual hydrocarbons from inorganic materials wherein the solvent separation from the residual hydrocarbons is accomplished without damage to the environment and with essentially complete solvent recovery.

A still different object of this invention is to provide a process for the separation of a chlorinated hydrocarbon solvent from a bitumen/hydrocarbon rich solvent solution at ambient pressure and at temperatures lower than the boiling temperature of water.

Yet another object of the invention is to provide a system for the removal of bitumen from tar sands, or the remediation of soils contaminated with hydrocarbons, which system is portable, does not require voluminous amounts of water for processing, wherein the processing solvents and recovered bitumen or hydrocarbons are contained in a closed system and do not contaminate the environment.

Another object of this invention is to provide a flashing apparatus that will enable the separation of one liquid, having a first lower boiling point or higher vapor pressure, from admixutre in a second liquid, having a higher boiling point or lower vapor pressure by means of a process which expands surface area exposure of the admixture within the flashing at a temperature sufficient to cause the first liquid to flash from the surface as a vapor.

These and other objects are accomplished by means of a process which may utilize any conventional solvent extraction means wherein the hydrocarbon is stripped from its inorganic substrate or carrier thereby forming a hydrocarbon rich solvent that is separated from its inorganic matrix leaving the inorganic phase essentially depleted of all hydrocarbon and solvent. The solvent is then separated from the hydrocarbon in a process that utilizes flashing of the solvent in a column without the necessity of producing and sustaining a lowered or negative pressure. The solvent depleted hydrocarbon is withdrawn from the bottom of the column and the flashed solvent vapors are strategically withdrawn from the column and passed into a condensation column wherein the vapors are condensed into a liquid that may be recycled back to the extraction process or stored for other use.

The flashing operation is facilitated or enabled in that it has been found that an increase in the surface area of a hydrocarbon rich hydrocarbon solvent solution, maintained at a temperature between about 100° to 212° F. (40° to 100° C.) at ambient pressure, will result in the flashing of the solvent from the hydrocarbon when the rich solvent is fed into the top of a column having apertured trays or other means which enables the gravity flow of the solution from one tray to the next resulting in the increase of the surface area of the solution as it flows from tray to tray with the concomitant flashing of solvent that is then strategically removed from the column. The process is particularly adapted to the use of chlorinated hydrocarbon solvents and most particularly to the use of methylene chloride.

The flashing operation and column as described can be utilized to separate fluids from any solution where the vapor pressures of the fluids making up the solution are sufficiently different to enable the fluid having the higher pressure to flash from the solution upon repeatedly maximizing the surface area exposure of the solution at a temperature which causes the fluid having the higher vapor pressure to vaporize.

DETAILS DESCRIPTION OF A PREFERRED EMBODIMENT

Figure 1:
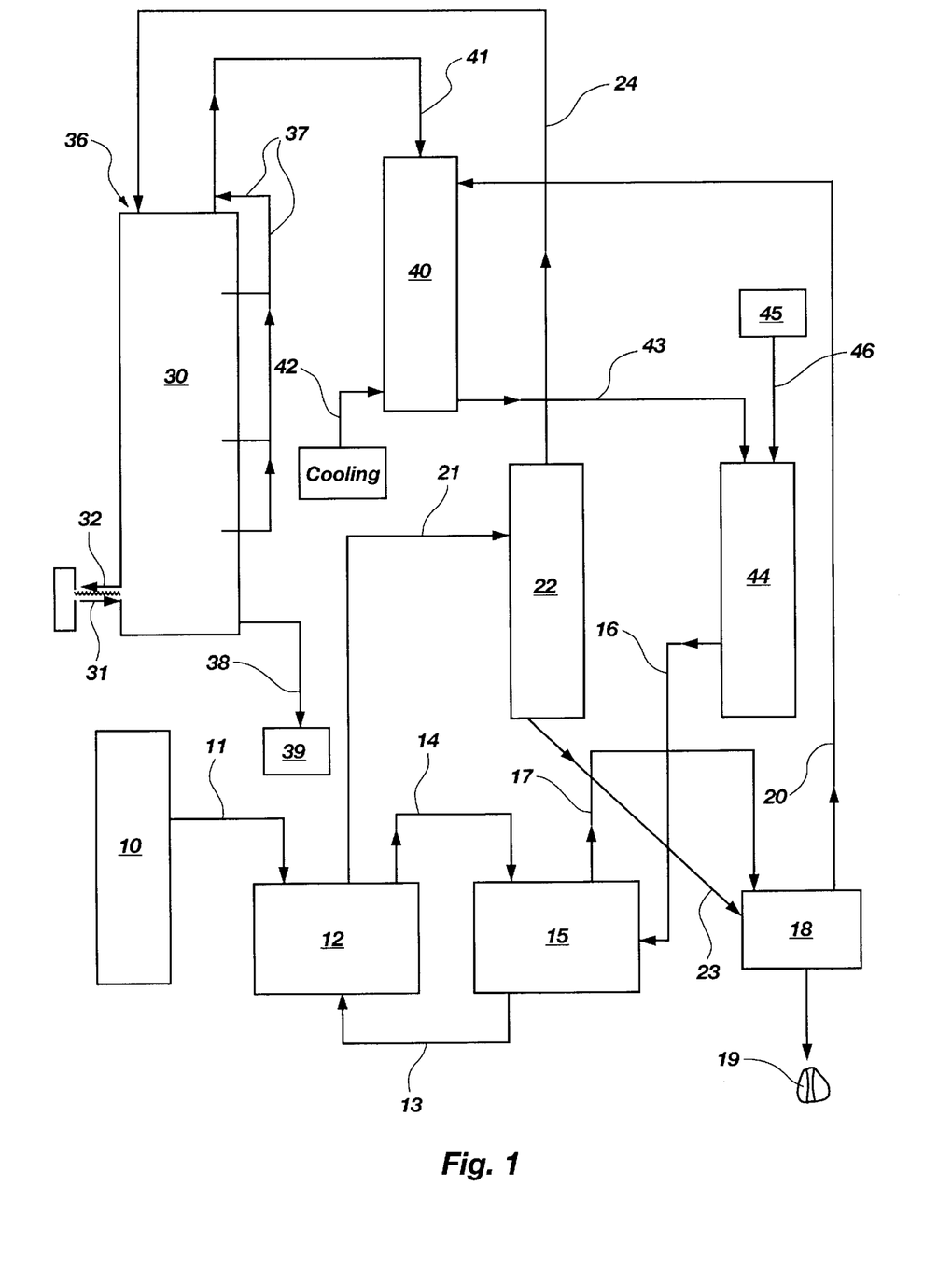
FIG. 1 is a simplified flow diagram of the overall process of the invention including the mixing of the hydrocarbon containing sand or soil with the solvent, the solvent extraction step, the flashing of the solvent from the hydrocarbon/solvent solution, the condensing of the solvent for recycle or storage and the disposal or removal of the sand or soil.

There is shown in FIG. 1 a general flowsheet of the invention with FIGS. 2 through 5 illustrating a preferred embodiment of the present invention as it relates to the separation of the solvent from the hydrocarbon rich solvent following removal of the rich solvent from the inorganic sand or soil.

The sand or soil is first processed by crushing, milling, or any other mechanical operation 10 that renders the particles suitably sized for mixing with the solvent. While the processing preferably takes place on site, the sand or soil may be transported to a central location for processing. In most instances, the soil or sand will not require any preparatory steps. Certain sludges and tar sands in the form of agglomerated clumps readily disperse when introduced into a vat or tank containing the solvent. The only requirement is that the particulate size of the material from which the hydrocarbon is to be removed must be such that the solvent can dissolve the hydrocarbon from the inorganic carrier matrix and wash the surface of the inorganic particles in order to bring about complete hydrocarbon removal. Some materials, such as an asphalt road from which the asphalt is to be separated from the aggregate, may require more vigorous processing. Also, if desired, the soil or sand may be mixed as a water slurry for ease in handling, sizing, transporting and the like. The slurry water can be recovered and recycled when the sand or soil is placed in an extraction apparatus. Most of the solvents are either immiscible or have very limited solubility in water. The preferred solvents, such as methylene chloride, have a greater density than water. Therefore, water used in slurrying the sand or soil rises to the top of a mixing vessel or tank and can be withdrawn.

The suitably sized sand or soil is transferred from any sizing means 10 via line 11 to an extraction apparatus 12. There the solvent breaks the larger clumps into smaller particles which results in increasingly greater surface area contact as the original clumps become loose and the hydrocarbon is dissolved into the solvent. In order to accomplish this, the amount of solvent added must be sufficient to dissolve all of the hydrocarbon present. Generally, the ratio of solvent to hydrocarbon will be in the range to about 5:1 to 0.5:1 by volume. This of course depends on the nature of the material being treated and the solubility of the hydrocarbon being removed in the solvent. In some instance, it may be preferable to treat the extraction is a series of steps wherein the material being processed for hydrocarbon removal moves in countercurrent direction to the solvent being introduced. If not all of the hydrocarbon is removed in the first extraction container 12, the partially hydrocarbon depleted inorganic material is moved, as represented by line 14 to a second extraction or rinsing container 15. Fresh solvent is introduced into the second container 15 via line 16 to remove any residual hydrocarbon. That solvent, only partially saturated with hydrocarbon, is then introduced via line 13 into the first container where it becomes more fully saturated by dissolving the hydrocarbon from the initially introduced hydrocarbon containing soil or tar sand. Obviously, this process can be repeated as many times as necessary to maximize hydrocarbon yield and produce a soil or sand fully, or at least substantially, depleted of all hydrocarbon. The countercurrent movement of the solvent against the raw or unprocessed sand assures that maximum solvency is available to remove the final amounts of hydrocarbon from the sand or soil. However, it is to be emphasized that the extraction process may only require a single solvent application and that the number of solvent removal steps employed may be gauged by the results desired.

To maximize the contact between the solvent and the hydrocarbon on the soil or sand, the container in which the extraction is taking place is preferably one in which contact is facilitated by agitation. Various means are available to accomplish this such as a stirring mechanism, a rotating vessel having paddles or blades on the inner walls and the like. The soil or sand will move by gravity to the bottom or lower end of the extraction container and may be drained or moved as a slurry to the next step or container.

The hydrocarbon depleted sand or soil is removed from the extraction stage and may be deposited at the site of processing or transported to another site if desirable. If needed, the sand or soil may be passed, as represented by line 17, to a heated vessel or drier 18, such as a rotary kiln, to vaporize any solvent remaining on the sand or soil. A hooded mechanism (not shown) that captures the vapors and recycles them, as shown by line 20, to a condenser 40 for reuse in the process may also be used if needed to mninimize any environmental concerns. However, the amount of solvent remaining on the sand may be so minimal that such processing is unnecessary. The sand 19 is then ready to be deposited on site or disposed of as desired.

Chlorinated hydrocarbons have high vapor pressures and do not have a great affinity for inorganic sand or soil particles. Therefore, any solvent remaining on the sand or soil particles will be minimal if the solvent is adequately drained from the sand particles in the last stage of the extraction process, e.g. when sand is removed from unit 15 through line 17. Such separation processes are well known in the art.

The rich solvent from the extraction step may contain fines depending upon the soil or sand being extracted. Some tar sands, for example, contain extremely small clay particles. Also, sites needing hydrocarbon remediation may come from a wide array of soils. In such instances it may be propitious to pass the rich solvent, as shown by line 21, through a fines removal separator 22. Various mechanisms are available ranging from settling of the fines by gravity, the use of cyclones or other means of centrifugal force or even filters. This processing step is optional and may not be necessary if the fines are minima or if their presence in the recovered hydrocarbon is not inimical to further processing or use. If utilized, fines separated in separator 22 pass through line 23 to the sand dryer 18 or otherwise disposed of.

The rich solvent is introduced, as represented by line 24, into the solvent separation and recovery portion of the process. It is to this process that the present invention is particularly applicable. It may be utilized for the recovery of bitumen from tar sand, soil remediation for the removal of hydrocarbons and the removal of one liquid having a lower boiling or vapor pressure from and admixture with another liquid having a higher boiling or vapor pressure.

Previous extraction and solvent removal operations have often required inimical steps or conditions such as the heating of the extraction mixture above the boiling point of the solvent and the application of pressure to keep the solvent in the liquid stage in order to bring the bitumen in solution. Blaine, U.S. Pat. No. 4,046,669, teaches a tar sand extraction process using temperatures as high as 800° F. and pressures as high as 200 psig with a temperature of about 300° F. and a pressure of about 50 psig being optimal. Under such conditions, solvent removal is accomplished in part by the removal of pressure to allow distillation or flashing of the solvent from the rich solvent solution. Gagon, U.S. Pat. No. 4,342,639 utilizes a negative pressure to flash solvent from a bitumen rich solution accompanied by a positive pressure to condense the solvent vapors. Haschke, U.S. Pat. No. 4,532,024 suggests that pressure is not a critical feature but requires that a two stage distillation process be employed, the first to remove a majority of the solvent and the second, heating the remaining solvent, bitumen solution, which has been diluted with a stripper solvent, to a temperature above the boiling point of the stripper solvent, e.g. 265–320° F. Such applications of heat and/or pressure requires the expenditure of energy considerably above that which is required by the present process.

It has been found that by using the flashing column as described more in detail hereinafter, the temperatures utilized need not be greater than the boiling point of water and the application of pressure is not necessary at all. Further, except for purposes of slurrying the initial contaminated soil or tar sand mixture to be extracted, the only process water that is required is sufficient circulating water in two enclosed cycles, i.e. a cycle through line 31 to heat the flashing unit 30 and a cooling cycle to through line 42 to condense solvent vapors in the condenser unit 40. Temperature efficiencies may be optimized by insulating the flashing column 30 to prevent loss of heat or in the condensing column 40 to minimize hot summer temperatures from affecting the condensation of the solvent With reference to FIGS. 2 through 5, the flashing column 30 is a vertical column divided horizontally by a series of closely stacked apertured plates or trays 33 and 34. Preferably, trays 33 and 34 have a diameter less than the diameter of the column such that the tray perimeter terminates inwardly a short distance from the inner surface of the column wall leaving an annular space 50 the length of column 30 through which flashed solvent vapors can pass to an appropriate vapor exit opening 37 and then pass via line 41 into the condensation unit 40. Extending vertically through and interconnecting the plates inside the column is a series of interconnected pipes 31 for circulating hot water or other suitable heated liquid throughout the column interior. Heating means 32 maintains the temperatures of the heated liquid at the desired temperature. Heating means 32 may be a hydrocarbon fueled heater (e.g. gasoline, diesel, propane, etc.) or electrically operated (e.g. resistance heating). If the conditions are favorable, recovered hydrocarbons or light hydrocarbon ends from the recovered bitumen could also be cycled to a hydrocarbon fueled heating means. Obviously, other heating means, which are equivalent to circulating hot water could be used. Electric heating coils may be wrapped around the column exterior and the trays may be constructed of a material which provides for controlled resistance heating from an applied electrical potential. Such means, if economical, could further minimize the need for process water.

Figure 4:
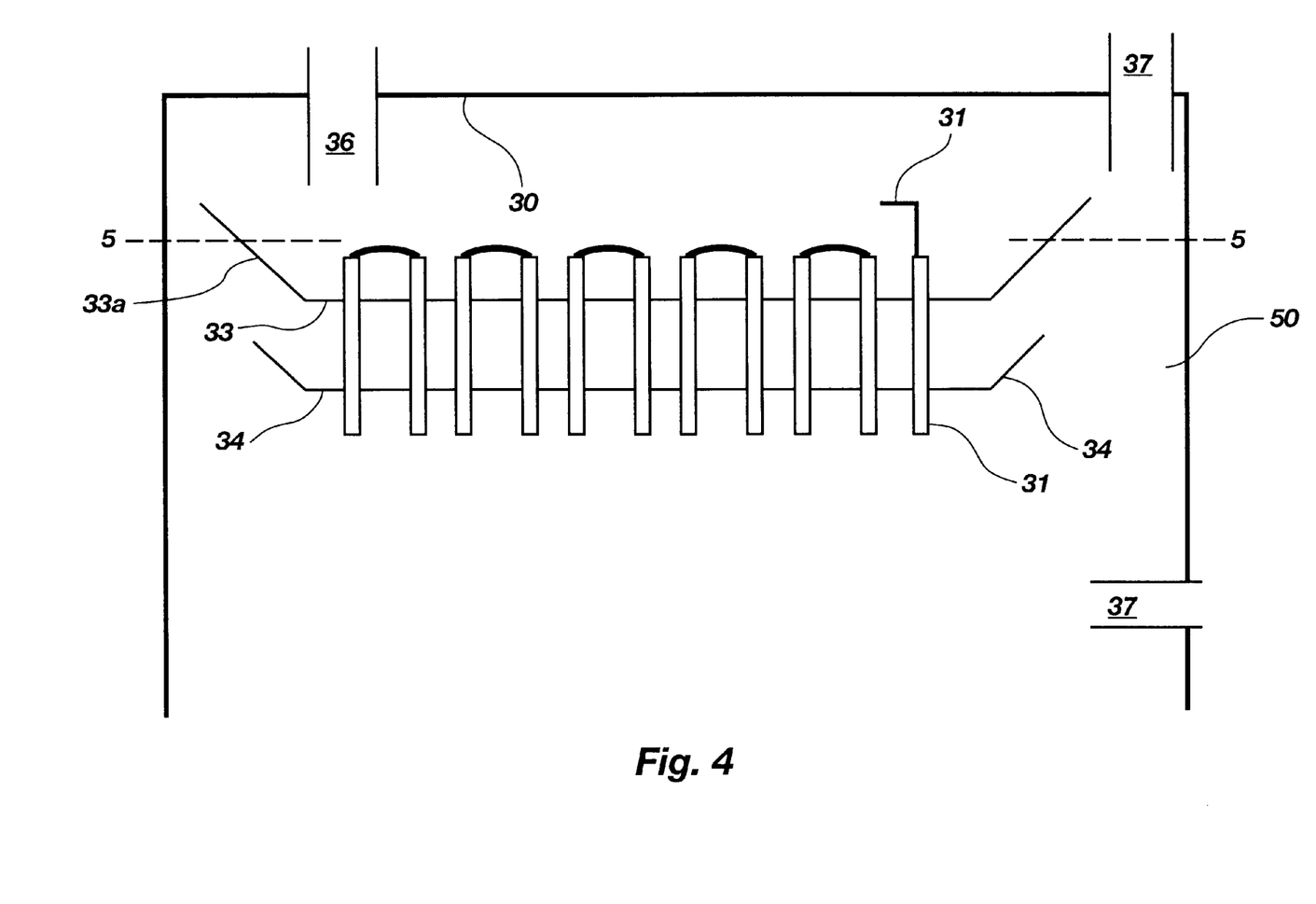
FIG. 4 is an enlarged partial side view of the upper portion of the flashing column shown in FIG. 2.
Figure 5:
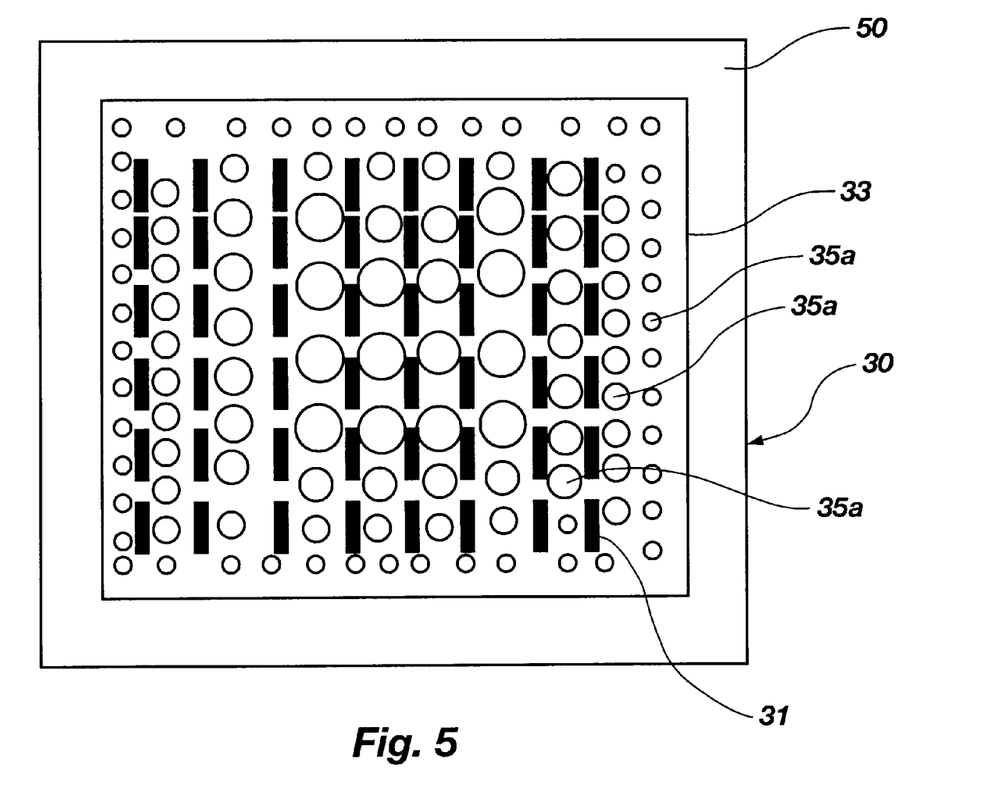
FIG. 5 is a horizontal cross sectional view of the flashing column showing the top tray taken along lines 5—5 of FIG. 4.

The uppermost tray 33 is adapted to receive the rich solvent solution entering through valve 36. Preferably tray 33 will have an upwardly extending lip or rim 33a at the perimeter to prevent rich solvent from flowing over the perimeter. Also, apertures 35a in tray 33 preferably increase in size from the perimeter toward the center to direct the flow of the rich solvent toward the interior. The structure will depend somewhat on the manner in which the rich solvent solution is introduced into the column. The rich solvent is introduced via line 24 into an entry valve 36 at the top of column 30. Depending on the viscosity of the rich solvent, valve 36 may contain a nozzle such that rich solvent enters the top of column 30 as a course spray, in which event it may be distributed relatively evenly on the surface of tray 33. In the alternative, the inch solvent may be allowed to flow in as a stream. If the tendency is to flood the upper tray 33 as a liquid stream, it is preferable that the apertures 35a in tray 33 be sized and situated so as to evenly distribute the rich solvent solution on the next underlying tray 34. The mode of introduction will generally dictate that the size of the apertures increase from the perimeter the center of the tray. It either event, the rich solvent collides with the upper surface of the first underlying tray 34 and by gravity flow passes through the apertures 35 contained in that tray and on to the next and so on to the bottom of the column.

Figure 2:
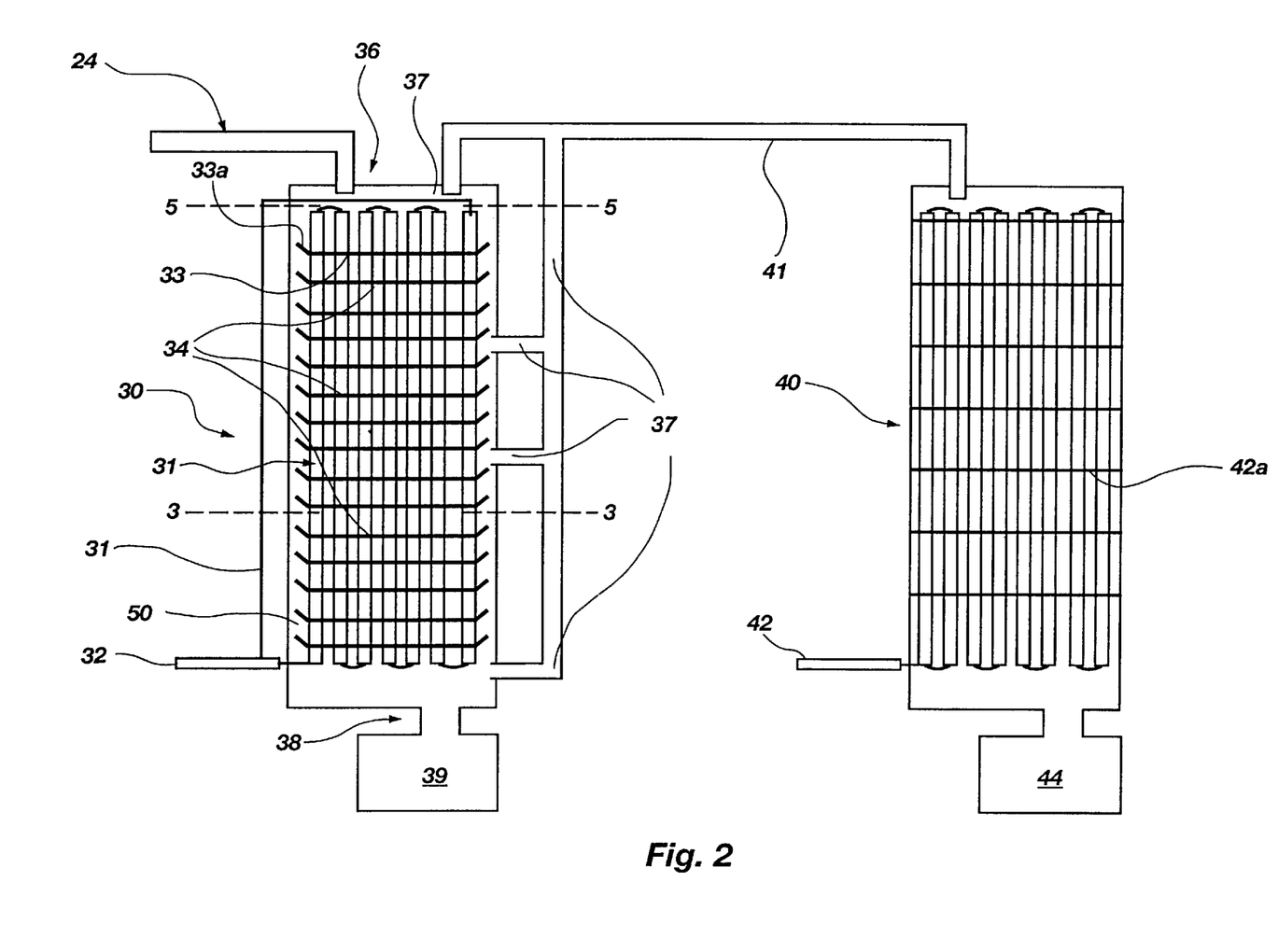
FIG. 2 is an elevational side view showing in vertical cross section the flashing column and condenser in greater detail.

The trays 33 and 34 are vertically stacked to be relatively close together, e.g. 0.5" to 12" and preferably between about 0.5" and 1.5' apart and the apertures 35 of trays 34 are preferably offset from tray to tray to ensure that solution falling through an aperture of one tray strikes the tray surface in the tray immediately below. The size of the apertures may vary and may be uniform or either decrease or increase in diameter from top to bottom of the column 30. In most instances the viscosity of the solution passing by gravity through the column will increase as the solvent, or lower boiling liquid, is flashed away. Therefore, the diameter of the apertures 35 will normally increase from top to bottom. The variance in aperture size may be calibrated such that there is an increase in each succeeding tray. Or, two or more trays may have the same aperture diameter followed by two or more following trays having a next larger diameter and so on.

The height and diameter of the column, the number of trays and the number of apertures in the trays can be adapted or arranged according to the hydrocarbon content in the rich solvent, the viscosity of the rich solvent solution or any other process parameters. Column dimensions are a matter to be determined for each designed application Column lengths as short as three feet or as high as fifty feet and diameters of from one to fifteen feet may be functional. In fact, functionality is the only limit to dimensions or size.

The critical factor in determining column size and tray location is that the surface area of the solvent hydrocarbon mixture is maximized during the course of transit from top to bottom of the column to enable flashing of the solvent from the hydrocarbon. Therefore, there needs to be sufficient dwell time in the flashing column to provide for adequate solvent surface exposure. Dwell time is largely dictated by the number of trays within the column. It may be that a multiplicity of shorter columns arranged in series may be more efficient than one tall column. Both arrangements are contemplated to be within the scope of this invention.

It is also desirable to remove the flashed solvent from the column as quickly as possible. Because the density of the solvent may be relatively high, e.g. methylene chloride has a density of about 1.33 g/ml, it may be beneficial to withdraw the flashed solvent vapors from various strategic locations along the height of the column rather than attempting to withdraw all flashed vapors overhead. This is particularly true in situations where taller column(s) are used for flashing purposes. This allows the use of lower flashing temperatures throughout the length of the column and the more efficient removal of vapors that are denser than the air in the column at the flashing temperature. Therefore, the key to operability is not the precise location at which the solvent vapors are removed but that the solvent vapors are removed somewhere along the length of the column at the temperature of operation. It may be beneficial to allow the vapors to be withdrawn from various vertical locations along the column and pass into a manifold for transfer to the condensation column.

The interior of column 30, including the trays 34, are heated to the desired temperature by the circulation of hot liquid, e.g. water, through the pipes 31 which extend through the trays in the column. The pipes form a closed system connected to a heating means 32 such that the water is recirculated from the column to the heating means and back again.

After passing through apertures 35a in tray 33, the rich solvent collides with the upper surface of the first tray 34 and by gravity flow passes through the apertures 35 contained in that tray and on to the next and so on progressing downward to the bottom of the column. Upon the striking of a each tray surface and exiting through an aperture, the solvent/hydrocarbon mixture breaks into droplets or at least has its exposed surface area increased. The temperature inside the column, regulated by the temperature of the circulating fluid and the rate at which the rich solvent is injected into the column, assures that the hydrocarbon and solvent are maintained at a temperature sufficiently high that the solvent will flash from the hydrocarbon containing solution at exposed surface areas. For most efficient operation, it is preferable that the temperature in the flashing column is maintained at or above the boiling point of the solvent When using methylene chloride as a solvent, it is preferred that the flashing column be operated at temperatures between about 100°–200° F. with temperatures of between about 160°–180° F. being optimal.

The exposure of the surface of the solvent and hydrocarbon mixture to the ambient atmosphere inside the column causes solvent to flash from the mixture because of its high vapor pressure relative to the hydrocarbon and pass through one or more exit ports 37 in the column 30 and pass via a connecting line 41 into a condenser 40. Connecting line 41 may be in the form of a manifold receiving vapor from exit ports 37 at various locations in the column and passing the same to condenser 40. Due to the relatively small size of apertures 35 and 35a, most vapors will pass outwardly to annular space 50 at the column wall and exit through an exit port 37. Because the solvent vapors may be more dense than air, the location of the exit ports 37 may vary so as to remove vapors from the lower portion of the column Some solvents may be withdrawn overhead through an exit port in the upper end of the column. However, if the solvent vapors are heavier than the air in the column at the temperature at which they vaporize they may actually sink. Therefore, strategicly locating the vapor exit ports may optimize solvent vapor removal. The withdrawal of solvent vapors from the flashing column into the condensation column will cause a pressure differential between the flashing column and the condensation column that will expedite the flow of vapors out through the exit ports due to the lower pressure in the condensation column.

The solvent content of the mixture decreases and the hydrocarbon content increases as the solvent solution passes downwardly through the column, or in the case of multiple columns arranged in series, from column to column. In the case of heavy hydrocarbons, such as bitumen from tar sands or recovered asphalt from used road beds, the viscosity of the hydrocarbon will increase as it becomes more solvent depleted and moves downward through the column. This may require that the apertures in the trays increase in diameter as they progress from top to bottom to accommodate the flow of an increasingly viscous liquid.

For tar sand extraction, it has been found that aperture sizes ranges from as small as 0.10" at the top of the column to as great as 0.50" at the bottom are within an operable range with sizes of between about 0.125" and 0.25" being optimal. The apertures need not necessarily be uniform in size for any given tray.

It is essential that the diameter of the apertures in the trays are sufficient that the hydrocarbon can pass through to the bottom of column 30 for removal via line 38 into a storage means 39 or transport line. The hydrocarbon removed at the bottom of the column is essentially free of all solvent. If not, two or more flashing columns can be arranged in series such that the hydrocarbon liquid removed from the bottom of one column passes into the top of an adjoining column. It is not thought that such will always be necessary but that option is not to be precluded The hydrocarbon recovered at the bottom of the flashing column will have sufficient fluidity to flow into a storage tank 39 for transport to a refinery or other place of processing.

Figure 3:
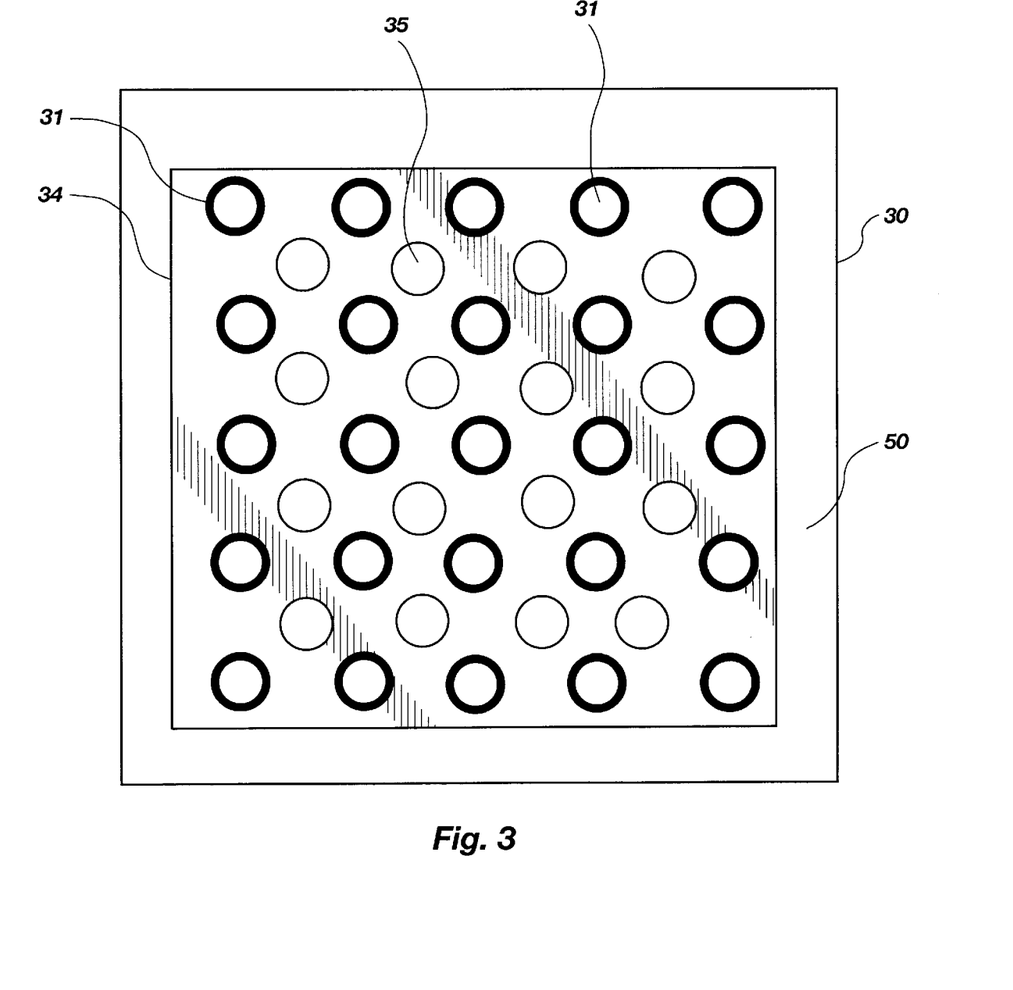
FIG. 3 is a horizontal cross sectional view of the flashing column taken along lines 3-3 of FIG. 2.

Column 30 may be of any desired configuration in horizontal cross section, e.g. round, square, rectangular, hexagonal and the like. Because of the intended portable nature of this column it is desirable that it can be transported with the longitudinal axis of the column being horizontal, e.g. lying down. In that situation, it may be advantageous to have a square or rectangular cross section to make it more secure from rotation during transport The lean solvent vapors in the flashing column 30 exit at ports 37 and pass via line 41 into a condensation column 40 which is cooled by cold circulating water, or other fluid means, in lines 42. Hines 42 may be secured in place by brackets 42a or any other type of projecting support means. Also, lines 42 may be replaced by helical coils or any other suitable cooling mechanism. As noted above, as the solvent vapors condense inside condenser 40 there is a concurrent lowering of pressure in the condenser unit creating a natural vacuum which serves further to withdraw solvent vapors from the flashing column 30 via line 41 without the need of a vacuum pump or compressor. Thus, it can be seen that no externally applied vacuum or pressure is required to facilitate solvent flashing or removal. It is significant that the exit ports 37 and solvent vapor line 41 are sufficiently large in cross section that the flow of solvent vapors from the flashing unit 30 to the condenser 40 will not encounter resistance or an increase in pressure. In that regard, the condenser 40 should be located relatively close in proximity to the flashing unit to take advantage of the pressure drop that occurs from the condensation of the vapors in the condenser 40.

The lean solvent is withdrawn from the lower end of the condenser via line 43 into a storage unit 44 or is recycled via line 16 back to the extraction units. If necessary, an auxiliary solvent tank 45 may supply solvent to the system via line 46 to replace any solvent lost during the extraction and flashing process. This will be minimal as the system is essentially a closed loop with the only solvent losses occurring resulting from any incomplete solvent removal from the flashing operation or solvent left on the cleaned sand or soil following extraction.

Various modification can be made in the process as described. For example, while multiple flashing columns connected in series have been referred to, multiple extraction units and flashing columns can also be operated in parallel and the flashed vapors passed from the multiple flashing columns into a single condensation unit or column. The system is particularly adaptable to portable operations. The entire system can be transported on a truck bed or flatbed railroad car for on site processing of soils needing remediation or tar sand processing. This obviates, or at least minimizes, the need to transport sand or soil. Also, since solvent losses are minimal, large amounts of solvent need not be required for any given operation.

Apparatus and means for solvent extraction, sand drying and/or disposal and even the condenser units are generally available and can be readily operated by one having ordinary skill in the art. However, the flashing column, its operation and the system and methods described herein are unique. The flashing unit can be constructed of any durable materials which provides for adequate heat exchange between the circulating heating fluid and is not easily corroded by the hydrocarbon solvent mixture being passed into it for flashing of the solvent. High carbon steel, stainless steel, nickle and chromium containing steels and the like are suitable materials. Preferably, the entire system, from particle size reduction means, extraction unit(s), flashing column(s), condenser and solvent and hydrocarbon storages means are adapted to be contained on a flat bed truck or railroad car, or series of trucks or cars. These can be taken to any remediation site or tar sand deposit and operated on location. Minimal amounts of water are required. The water for heating the flashing column is in a closed system and only minimal small amounts of make up water may be required. The water to cool the condenser unit can also be in a closed system; however, in that instance, a refrigeration unit might be required to remove the heat absorbed due to the heat absorbed by the water in the condensing of the solvent vapors. Preferably, the cold water circulated to and through the condenser unit can be utilized for other purposes. Also, fluids other than water may be used. For example, hot circulating hydrocarbon or silicone based oils, resistance heating or any other equivalent means may reduce or eliminate the need for water. The cooling for the condenser may also be supplied via refrigeration units. In other words, it is possible to utilize the system of the present invention without the presence of any water if necessary. However, water is the preferred heating and cooling fluid. Also, it may be beneficial to first form a water slurry from the contaminated soil or tar sands for ease in handling, sizing, and the like. As explained, this slurry water can be withdrawn and recycled.

Because of its non-flammability, high vapor pressure at temperatures of operation and high density, in addition to its solvency power for a great range of hydrocarbons, methylene chloride is the preferred solvent.

The flashing column 30 can be adapted in design and mode of operation for numerous other applications other than tar sand extraction and soil remediation purposes. The column 30 can be used to separate any suitable liquid having a lower vapor pressure and/or boiling point from a solution containing a liquid having a higher vapor pressure and/or boiling point. There are numerous instances in the chemical industry, other than the refining of petroleum, where fractional distillation is used to separate liquids. This normally involves a raising of the temperature of such a solution contained at the bottom of a column wherein and the vapors are taken off and condensed in fractions. The lower boiling fraction is removed first, and so on until only the highest boiling material remains in the column. The present flashing column allows more versatility and also use in smaller type operations for such separations. Also, one does not have to use the boiling method but can take advantage of the flashing column to accomplish such liquid/liquid separations. If there is a mixture containing more than two liquids to separate, each having different boiling point, i.e. which can be fractionated, a series of flashing columns could be utilized, each maintained at a temperature adapted to flash out of solution the liquid to be recovered;

Although this invention has been described and illustrated by reference to a preferred embodiment, this is exemplary only and the invention is limited only in scope by the following claims and functional equivalents thereof.

What is claimed is:

1. A process for the separation of hydrocarbons from a hydrocarbon containing particulate inorganic base material comprising the steps of:

mixing said hydrocarbon containing inorganic base material with a chlorinated organic solvent forming a hydrocarbon rich solvent solution of extracted hydrocarbon and chlorinated solvent and a particulate hydrocarbon depleted inorganic base material;

separating said rich solvent solution from said particulate hydrocarbon depleted inorganic base material;

introducing said hydrocarbon rich solution into the uppermost portion of a flashing system comprising one or more vertical flashing columns, which, if multiple columns are used are arranged in series, said hydrocarbon rich solution being passed into the upper portion of each such vertical flashing column having walled portion enclosed by an upper end and a lower end defining an enclosed column interior said upper end having an entry port for the introduction of rich solvent solution into the column interior, said lower end having an exit port for the removal of solvent depleted hydrocarbon from the column interior, said column interior being horizontally divided along the walled portion by a series of vertically aligned apertured trays and being maintained at an elevated temperature sufficient to cause said solvent to vaporize from the surface of said solution; said column further having multiple vapor exit ports along said walled portion and said upper end for removal of solvent vapors from the column interior, causing said introduced hydrocarbon solution to be deposited on the uppermost of said trays in each such vertical column such that said solution flows downwardly through the apertures of said uppermost tray and on to the next flowing downwardly from one tray to the next by gravity flow with said solution contacting each tray in succession and flowing through the apertures thereof causing an increase in the surface area of said solution as it flows through the apertures of each of said trays with the result that solvent is flashed from said solution at the exposed surfaces thereof and passes through an exit port such that the solvent content of the solution decreases from tray to tray resulting in essentially solvent free hydrocarbon extract at the bottom of the last flashing column in said flashing system;

withdrawing flashed solvent vapors from each flashing column through said vapor exit ports without pressure increase into an enclosed condensation column wherein said chlorinated solvent is liquified by temperature reduction and recovered; and withdrawing said hydrocarbon extract essentially free of solvent from the exit port at the bottom of the last flashing column of said flashing system.

2. A method according to claim 1 wherein said flashing system consists of a single vertical flashing column.

3. A method according to claim 1 wherein said flashing system consists of a multiple vertical flashing columns arranged in series.

4. A method according to claim 2 or 3 wherein said horizontal vertically aligned trays have a diameter less than the diameter of said column such that there is an annular space in said column interior between said trays and the walled portion of the column.

5. A method according to claim 4 wherein said trays have an upwardly extending red perimeter.

6. A method according to claim 5 wherein the rimmed perimeter of said uppermost tray is more pronounced than on said remaining underlying trays.

7. A method according to claim 6 wherein the apertures in said uppermost tray vary in diameter increasing in size from the perimeter to the center.

8. A method according to claim 4 wherein said apertures in adjacent trays are not vertically aligned.

9. A method according to claim 8 wherein the apertures in the trays incrementally increase in diameter from the upper end of a column to the lower end thereof.

10. A method according to claim 9 wherein said column interior is heated by a heated liquid passing through a series of vertically aligned interconnecting pipes extending through said horizontal vertically aligned trays.

11. A method according to claim 9 wherein said hydrocarbon containing particulate inorganic base material is a member selected from the group consisting of tars sands and hydrocarbon contaminated soils.

12. A method according to claim 11 wherein said chlorinated solvent is methylene chloride.

13. A method according to claim 12 wherein each flashing column is heated to a temperature of between about 100° and 200° F.

14. A method according to claim 13 wherein the ratio of methylene chloride solvent mixed with the tar sand or hydrocarbon contaminated soil is between about 5:1 to 0.5:1 by volume solvent to hydrocarbon.

15. A method according to claim 14 wherein said hydrocarbon is extracted from said tar sand or hydrocarbon contaminated soil by methylene chloride in multiple extraction stages.

16. A method according to claim 15 wherein said tar sand and hydrocarbon contaminated soil and methylene chloride are introduced into said extraction stages in countercurrent directions.

17. A method according to claim 14 wherein bitumen is extracted from tar sand.

18. A method according to claim 14 wherein hydrocarbon is extracted from hydrocarbon contaminated soil.

19. A method according to claim 18 wherein said hydrocarbon contaminated soil is a sludge pond.

20. A method according to claim 19 wherein said hydrocarbon contaminated soil is an oil spill site.

21. A method according to claim 9 wherein said apertures in said trays can vary from between about 0.10° at the upper portion of the column to about 0.50° at the lower portion thereof.

22. A method according to claim 13 wherein said flashing column is heated by circulating hot water and temperature reduction in said condensation column is caused by circulating cold water.

* * * * *